United States Patent

[11] 3,571,537

[72] Inventors Dario J. Cook
 193 Hawthorn Drive, Painesville, Ohio 44077;
 Thomas E. Boyance, 8431 O'Melveny Ave., Sun Valley, Calif. 91352
[21] Appl. No. 1,097
[22] Filed Jan. 7, 1970
[45] Patented Mar. 23, 1971

[54] AUTOMOBILE TURNING-LIGHT SWITCH
 4 Claims, 5 Drawing Figs.
[52] U.S. Cl. .................................................. 200/61.38, 340/73
[51] Int. Cl. ................................................... H01h 3/16
[50] Field of Search ........................................ 200/61.54, 61.27—61.38; 340/55, 67, 73, 110, 111, 112

[56] References Cited
UNITED STATES PATENTS

| | | | |
|---|---|---|---|
| 2,021,386 | 11/1935 | Russell | 200/61.35 |
| 2,182,029 | 12/1939 | Markham | 200/61.38 |
| 2,224,457 | 12/1940 | Kobiella | 200/61.38 |

Primary Examiner—Robert K. Schaefer
Assistant Examiner—M. Ginsburg
Attorney—Sanford Schnurmacher ABSTRACT: An automobile directional signal switch having signal control buttons positioned at the center of the automobile steering wheel.

PATENTED MAR 23 1971  3,571,537

INVENTORS.
DARLO J. COOK
THOMAS E. BOYANCE
BY
Sanford Schumacher
ATTORNEY.

AUTOMOBILE TURNING-LIGHT SWITCH

The primary object of the invention is to provide a turning-light signal-control switch for automobiles that is housed in the hub of the steering wheel, with operational control buttons positioned on the upper surface of the hub at the center of the steering wheel.

Another object is to provide a device of the type stated, whose control buttons light up upon being depressed to indicate the direction of the turn for which the signal is being made.

A further object is to provide a turning-light switching system that is self-contained, requiring no separate tell-tale lights to be mounted on the instrument cluster, as is the case with prior art installations.

These, and other objects of the invention will become apparent from a reading of the following specification and claims, together with the accompanying drawing, wherein like parts are referred to and indicated by like reference numerals, and wherein:

Figure 1:
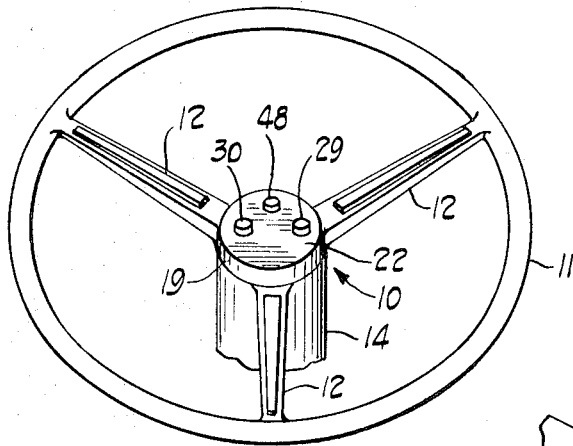
FIG. 1 is a perspective view of an automobile steering column and steering wheel, showing the automobile turning-light switch, that is the subject of our invention, positioned in the hub of the steering wheel.

Referring more particularly to the drawing, there is seen in FIG. 1 the automobile turning-light switch, that is the subject of our invention, broadly indicated by reference numeral 10, located in the hub 19 of a conventional automobile steering wheel 11, connected to its hub through spokes 12.

Figure 4:
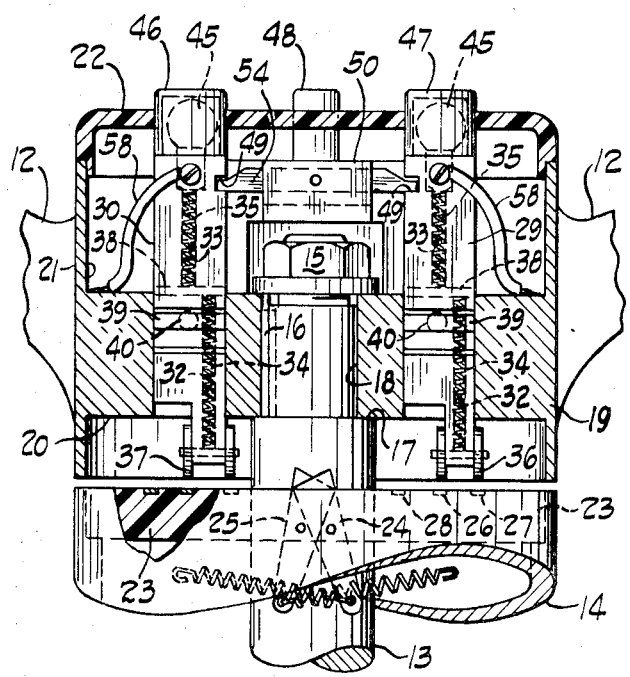
FIG. 4 is a vertical sectional view of the turning-light switch.
Figure 3:
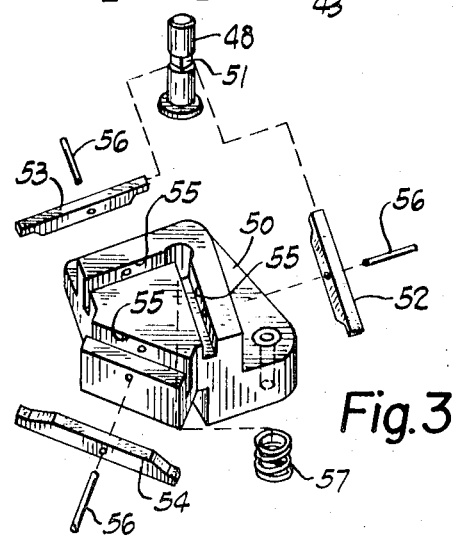
FIG. 3 is an exploded view of the signal cancelling unit.

Reference numerals 30, 29 and 48 indicate left turn, right turn and cancel buttons, respectively, which extend through the hub closure cap 22, as is seen most clearly in FIG. 4.

Reference numeral 13 indicates a conventional steering wheel shaft that is journaled in a stationary column, or housing 14.

The shaft 13 has a shoulder 17 spaced from its upper end.

The cylindrical hub member 19, which also serves as the housing of the switch 10, is mounted on the upper end of the shaft through its center bore 18, seated against the shoulder 17, made all-of-a-piece with the shaft 13, through a key 16, and locked in place by a nut 15, in the conventional manner.

Reference numerals 20 and 21 indicate lower and upper cavities, respectively, in the hub 19.

An electrical nonconducting disc 23 is mounted at the upper end of the stationary column 14, immediately below the hub cavity 20, as again seen in FIG. 4.

Three concentric metal rings 26, 27 and 28 are embedded in the upper face of the disc 23. The rings are preferably made of a good electrical conductor, such as brass or copper.

Figure 2:
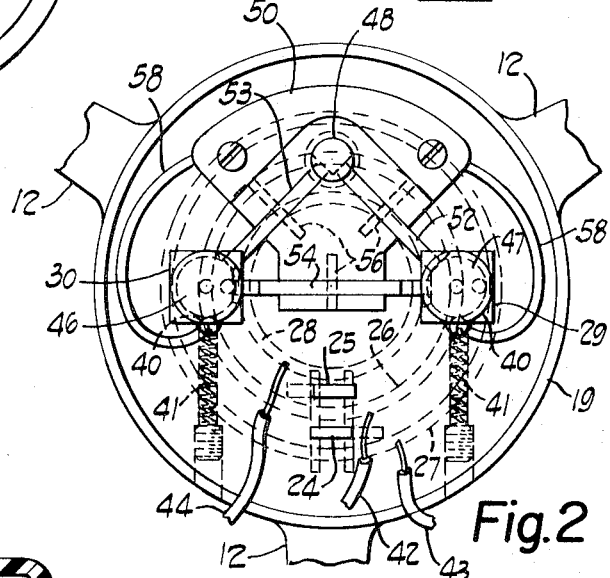
FIG. 2 is a top plan view of the steering wheel hub with the switch closure cap removed.

The middle ring 26 is connected to the car battery through cable 42. The outer ring 27 is connected to the right-turn signal light through cable 43, and the inner ring 28 is connected to the left-turn signal light through cable 44, as seen in FIG. 2. The signal lights, not illustrated, are grounded to the car frame to complete their circuits, all is well known to those skilled in the art.

Two tiltable dogs 24 and 25 are pivotally mounted between the rings, in the travel path of the switch rods 29 and 30, to be described hereinafter; the dogs are normally spring biased to an erect position.

The lower hub cavity 20 is open to the three rings of the disc 23 while the upper cavity 21 is closed by a removable cap 22.

Reference numeral 29 and 30 indicate two spaced and parallel, nonconducting, nonrotative, switch rods slidably mounted in the hub member 19, for independent vertical movement.

Figure 5:
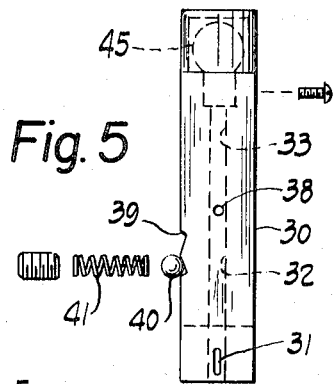
FIG. 5 is a side elevational view of one of the switch rods, in its unmounted condition.

Each switch rod has two spaced metal rollers mounted at the ends of a metal shaft, or axle, journaled in an elongated vertical bearing bore 31 proximate the lower end of the switch rod, as is seen most clearly in FIGS. 4 and 5.

In FIG. 4 the rollers mounted on switch rod 29 are identified by reference numeral 36, and those on switch rod 30 are identified by reference numeral 37.

The switch rods 29 and 30 are movable between a first, raised, position wherein the rollers are spaced upwardly of the disc rings 26, 27 and 28, as seen in FIG. 4; and a second, depressed, position wherein the paired rollers bear against adjacent disc rings, to complete an electric circuit therebetween, thereby energizing their associated turning-light signals.

The upper ends of the switch rods extend through the hub closure cap 22, to define push buttons.

Each switch rod has a double notch 39, as seen in FIG. 5, engageable by a metal ball 40 mounted in the hub wall and pressed against the double notch 39 by a spring 41. The balls 40 act to hold the switch rods in either their first or second positions until intentionally shifted.

Reference numeral 38 indicates a horizontal metal pin positioned centrally of each switch rod. A spring 34 mounted in a vertical bore 32 presses against the pin 38 and the roller axles, and acts to urge the roller axles against the lower edge of the elongated bearing bores 31. A second spring 35 mounted in a second vertical bore 33 extends upwardly from the pin 38 to the center contact of an electric bulb 45 housed in the upper end of each switch rod. The bulb shells are grounded through cables 58.

The bulbs 45 are covered by transparent caps 46 and 47. Cap 47 of the right-turn switch rod 29 is yellow, and cap 47 of the left-turn switch rod 30 is red.

Reference numeral 50 indicates a plastic, nonconducting, block mounted in the hub upper cavity 21, of substantially triangular shape, between the switch rods 29 and 30. The block 50 has 3 triangularly disposed channels 55 in which are mounted 3 rocker arms 52, 53 and 54, through pivot pins 56.

Reference numeral 48 indicates a cancel button which is mounted on the block 50 and extends through the hub closure cap 22.

The button 48 is linked to the switch rods 29 and 30 through rocker arms 52 and 53 which engage a notch 51 in the cancel button. The cancel button 48 is movable vertically between a first, raised, position and a second, depressed, position; and is normally maintained in its first position by a spring 57 seated in the block below the button.

The ends of rocker arm 54 interfit notches 49 in the switch rods 29 and 30, as seen in FIG. 4.

When either of the switch rods 29 or 30 are in their second, depressed, positions, depression of the cancel button 48 to its second position will raise the switch rods 29 or 30 to their first positions through tilting of the rocker arms 52 and 53.

Again, when one of the switch rods 29 or 30 is in its second position, the depression of the opposite switch rod to its second will cause the interconnecting rocker arm 54 to raise the first switch rod back to its first position. Thus, switch rods 29 and 30 cannot be simultaneously in their second positions.

Depending upon the direction of the turn for which the directional signal lights are to be activated the operation of switch 10, just described, is as follows:

In the situation where a right turn is about to be made, switch rod 29 is depressed to its second position. In this position the paired rollers 36 are pressed against the disc rings 26 and 27, closing the electric circuit from cable 42 to 43, to activate the automobile right-turn directional signal.

At the same time the circuit from the car battery is closed to the bulb 45, housed at the upper end of switch rod 29, through the roller axle, spring 34, pin 38 and spring 35, thus lighting up the bulb yellow cap 47 to indicate a right-turn setting to the driver.

As the steering wheel 11 and hub 19 are rotated to the right, the rollers 36 travel in a circular path along the rings 26 and 27, maintaining the electrical circuit just described.

As the hub member is turned the lower end of the switch rod 29 will contact, tilt, and pass over and beyond the dog 24 mounted between rings 26 and 27.

After the turn is completed the rotational direction of the steering wheel is reversed to straighten the wheels. As the switch rod 29 contacts the dog 24 in its reverse travel path, the inclined edge of the erect dog 24 will act to raise the switch rod 29 back to its first position, breaking the electrical contact between the rollers 36 and the disc rings 26 and 27, extinguishing the turning-light signal and the tell-tale bulb 45 of switch rod 29.

In signalling a left turn, the switch rod 30 is depressed to its second position, wherein the rollers 37 are pressed against the disc rings 26 and 28. This closes the electric circuit from cable 42 to cable 44, activating the automobile left-turn directional light and the tell-tale bulb 45 in the red cap 46 at the upper end of switch rod 30, to indicate a left turn setting.

As the steering wheel hub member 19 is rotated to the left, in making the turn, the lower end of switch rod 30 will contact, tilt, and pass over and beyond the dog 25 positioned between disc rings 26 and 28. Again, after the turn is completed, the rotational direction of the steering wheel hub 19 is reversed to straighten the wheels.

As the switch rod 30 contacts the dog 25 in its reverse travel path the inclined edge of the erect dog 25 will act to raise the switch rod 30 back to its first position, breaking the electrical contact between the rollers 37 and the disc rings 26 and 28, extinguishing the left turning-light signal and the tell-tale bulb 45 of the switch rod 30.

It will be noted that if it is desired to signal a change in the direction of the intended turn before the start of the actual turning operation, depression of the opposite turn switch rod will return the original switch rod to its first position, due to the action of the rocker arm 54, described hereinabove.

Again, if the turn-signal notice is to be cancelled altogether, depression of the cancel button 48 will return whichever switch rod is in its second position to its first position.

It will now be clear that there has been provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claims.

We claim:

1. In combination with an automobile steering wheel shaft rotatably journaled in a stationary housing, a turning-light switch, comprising:
   a. a cylindrical steering wheel hub member mounted at the upper end of the shaft, in linear alignment with the housing;
   b. an electrical nonconducting disc, mounted at the upper end of the housing, with three concentric, electrical conducting, rings embedded therein; the middle ring being connected to the car battery, the inner and outer rings being connected to the left and right turning-light signals, respectively;
   c. the hub member having an upper cavity, closed by a removable cap, and a lower cavity open to the three rings of the housing disc;
   d. two spaced and parallel, nonconducting, nonrotative, switch rods mounted in the hub member, for independent vertical movement;
   e. the upper ends of the switch rods extending through the hub closure cap, to define push buttons;
   f. the lower end of each rod having a pair of metal rollers spaced apart a distance to bridge two adjacent of said disc rings through a metal shaft journaled in a vertically elongated bore proximate the rod lower end;
   g. the roller shaft being normally spring biased toward the lower end of the bore;
   h. the switch rods being selectively movable between a first, raised position wherein the rollers are spaced upwardly of the disc rings, and a second, depressed, position wherein the paired rollers bear against adjacent disc rings, to complete an electric circuit therebetween, thereby energizing their associated turning-light signals;
   i. spring-pressed means mounted in the hub wall, engageable with each switch rod, and operable to maintain the switch rods in either their first or second positions;
   j. spring-biased dogs tiltably mounted on the housing disc in the circular path of each switch rod, operable to tilt level with the disc surface, when its associated switch rod, while in its second position, passes over it as the steering wheel hub is rotated in a wheel turning direction; and
   k. each dog acting to raise its associated switch rod from its second to its first position, thereby breaking the electrical circuit of its associated turning-light signal, when the switch rod passes over it as the steering wheel hub is rotated in a wheel-straightening direction.

2. A turning-light switch, as in claim 1, wherein the two switch rods are linked through a rocker arm pivotally mounted, at its center point, within the hub member upper cavity between the switch rods; said rocker arm acting to prevent both switch rods from being simultaneously in their second positions.

3. A turning-light switch, as in claim 1, wherein the upper end of each switch rod has an electric bulb housed therein, electrically connected to the switch rod roller shaft; said bulb being energized when the switch rod is in its second position.

4. A turning-light switch, as in claim 1, wherein the upper hub cavity has a cancel button mounted therein which extends through the closure cap; said button being linked, through separate rocker arms, to each switch rod; said button being vertically movable between a first, raised position and a second, depressed position; and, spring-biasing means mounted within the upper hub cavity, engaged with the lower end of the button, to normally maintain it in its first position; said cancel button, when in its second position, acting to tilt its rocker arms to raise the switch rods to their first positions.